BALANCED TO UNBALANCED TRANSISTOR AMPLIFIER

Filed March 23, 1967

INVENTOR
P. E. PROZELLER
BY R. B. Ardis
ATTORNEY

United States Patent Office 3,443,237

Patented May 6, 1969

3,443,237
BALANCED TO UNBALANCED TRANSISTOR AMPLIFIER

Paul E Prozeller, Fords, N.J., assignor to Bell Telephone Laboratories, Inc., Murray Hill, N.J., a corporation of New York Filed Mar. 23, 1967, Ser. No. 625,541
Int. Cl. H03f *3/04, 3/18, 3/68*
U.S. Cl. 330—14 12 Claims

ABSTRACT OF THE DISCLOSURE

A balanced to unbalanced transistor amplifier is disclosed comprising two transistors, preferably of opposite conductivity type. The collector of the first transistor is connected through a first resistor to the emitter of the second transistor, and the emitter of the first transistor is connected through a second resistor to the collector of the second transistor. The resistors are of equal value. One of the connection paths is used to furnish an unbalanced current signal to a following low input impedance amplifier. In phase and equal valued input signals are suppressed and only those input signals 180 degrees out of phase pass through the balanced to unbalanced amplifier.

*Background of invention*

This invention relates generally to video transmission systems and, more particularly, to transmission systems utilizing balanced cables. Usually, unbalanced signals are required within the system but cannot be obtained by using transformers because of the large number of octaves in the video band (0–4.5 mHz.), primarily because the low frequency cutoff point of the transformer conventionally is significantly higher than that of the transmitted signal.

In a video transmission system using a balanced line, information is transmitted 180 degrees out of phase on opposite sides of the line. Noise signals picked up on opposite sides of such transmission lines generally tend to be in phase. The desired information is out of phase by 180 degrees while the undesired information (noise) is in phase. Therefore, longitudinal signals (input voltages equal and in phase) are sought to be suppressed while the desired information (180 degrees out of phase) is sought to be transmitted.

Prior methods for achieving longitudinal suppression while converting from a balanced to an unbalanced signal conventionally comprise balanced amplifiers. The unbalanced signal is derived by using only one of the two output terminals. Consequently, since only half of the available amplification is being used, additional components are necessary to furnish additional amplification. Balanced to unbalanced amplifiers exhibiting the longitudinal suppression characteristic comprise a large number of components.

Patent No. 2,839,620 was issued to F. D. Waldhauer on June 17, 1958. It discloses a balanced transistor amplifier but differs from standard balanced amplifiers in that transistors of opposite conductivity type are utilized with the collector of a first transistor being connected to the emitter of the second transistor and the emitter of the first transistor being connected through the primary winding of an output transformer to the collector of the second transistor. This transistor configuration is similar to that presented by the applicant but includes a transformer coupling to the following stage, which is undesirable in the video range, as above described. The Waldhauer patent deals with transistor amplifier circuitry and does not relate to the field of balanced to unbalanced amplifiers with longitudinal suppression.

*Summary of the invention*

A primary object of the preesnt invention is, therefore, to provide a transistorized balanced to unbalanced amplifier.

A further object of the present invention is to provide a transistor amplifier which converts from a balanced input to an unbalanced output signal without the need for transformers.

A still further object of the present invention is to provide a transistor amplifier which can be directly coupled to following stages.

A still further object of the present invention is to provide a transistor amplifier which suppresses unwanted longitudinal interfering signals.

These above objects are accomplished through use of a balanced amplifier, preferably utilizing two opposite conductivity type transistors where the collector of the first transistor is connected to the emitter of the second transistor through a first resistor, and the emitter of the first transistor is connected through a second resistor to the collector of the second transistor. Each resistor is of equal resistance. One of the connection paths is directly coupled to a following amplification stage. The above described circuitry furnishes an unbalanced output signal which is directly connected to a following stage without the need for transformers. In addition, the balanced mode circuit configuration provides the desired longitudinal signal suppression during amplification and conversion from a balanced input to an unbalanced output signal.

Embodiments of the present invention, as taught in this application, may be composed of only capacitors, resistors and semi-conductors which lend themselves to present integrated circuitry and thin film techniques. Thus, the size of this balanced to unbalanced amplifier may be exceedingly small.

*Brief description of drawing*

A more complete understanding of the above mentioned and other features of the present invention may be obtained from a study of the following detailed description of a specific embodiment of the invention. In the drawing.

*Detailed description*

Figure 1:
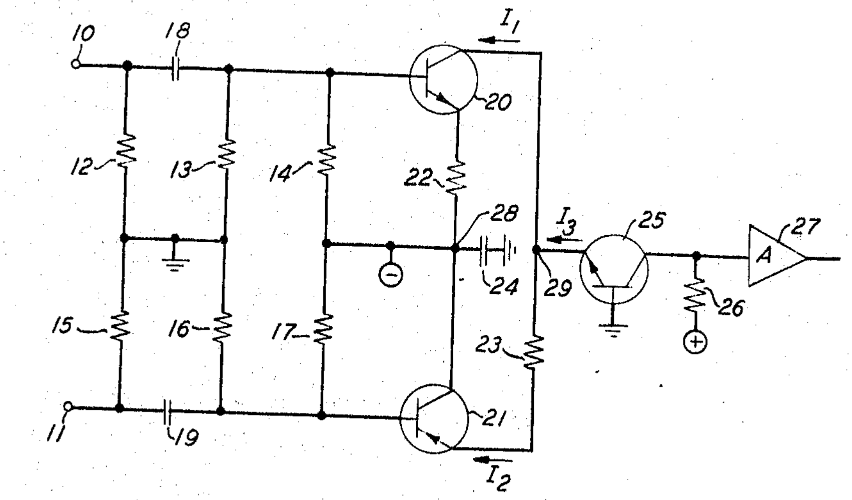
FIG. 1 is a schematic diagram of the applicant's balanced to unbalanced transistor amplifier.

As discussed above, prior methods for obtaining longitudinal signal suppression were unsatisfactory in view of the disadvantages attendant thereto. With reference now to FIG. 1 which is illustrative of an embodiment of the applicant's balanced to unbalanced amplifier, a balanced input signal is applied to terminals 10 and 11. One side of resistor 12 is connected to terminal 10, as is one side of capacitor 18. These two components form an input network for the signal received at terminal 10. The other side of capacitor 18 is connected to bias resistors 13 and 14 and to the base of transistor 20. For purposes of illustration, transistor 20 may be considered to be of the NPN type. The other sides of resistors 12 and 13 are connected together and, as shown, to a point of reference potential or system ground. Resistor 15 is connected to capacitor 19 at the input terminal 11. Resistor 15 and capacitor 19 form an input network for the signal received at terminal 11. The other side of capacitor 19 is connected to bias resistors 16 and 17 and to the base terminal of transistor 21 which is, for illustrative purposes, shown to be of the PNP type since transistor 20 is of the NPN type. Transistors of the same type may be utilized with proper bias adjustment, but for purposes of illustration opposite conductivity type transistors are shown. The other sides of resistors 15 and 16 are connected together and, as shown, to a point of reference potential or system ground. The other sides of bias resistors 14 and 17 are connected together, as shown, to a negative source of reference potential, to one side of emitter resistor 22 and to one side of blocking capacitor 24. The other side of capacitor 24 is connected to system ground. The second side of emitter resistor 22 is connected to the emitter terminal of transistor 20.

The output path which directly supplies the unbalanced output signal will now be described. The collector terminal of transistor 20 is connected to one side of emitter resistor 23 and to the emitter of transistor 25, which serves as a current amplifier. The other side of resistor 23 is connected to the emitter terminal of transistor 21. The collector terminal of transistor 21 is connected to the connection point for resistors 14, 17 and 22 and capacitor 24. The unbalanced output signal is directly supplied at interconnection point 29 to the emitter terminal of transistor 25. Transistor 25 is connected in the common base mode which provides a low input impedance looking into the emitter of transistor 25. The base terminal of transistor 25 is connected to system ground while the collector terminal is connected through load resistor 26 to a positive source of reference potential. A following amplifier 27 may also connect to the collector terminal of transistor 25 for additional amplification, if needed.

The operation of FIG. 1 may be simply described by assuming that one input signal is applied between the base terminal of transistor 20 and the point of reference potential 28 while a second input signal is applied between the base terminal of transistor 21 and reference potential point 28. The bias resistors will be properly selected to provide proper AC operation because the applied signals will be of a magnitude such as to maintain transistors 20 and 21 operating in the linear range. Since transistor 25 is connected in the common base mode, the input impedance seen at its emitter terminal is very low and will be assumed to be zero. Assume also that the betas, which are the common emitter current amplification factors, of transistors 20 and 21 are infinite and $R_{22}=R_{23}=R$. Then:

$$i_1=\frac{V_{in}}{R}$$

$$i_2=\frac{V_{in}}{R}$$

$$i_3=i_1+i_2$$

To illustrate the suppression of longitudinal signals, consider the input signal $V_{in}$ to be composed of two equal valued-in phase signals. Here, the currents $i_1$ and $i_2$ are equal but of opposite polarity so that:

$$i_3=i_1-i_2=\frac{V_{in}}{R}-\frac{V_{in}}{R}=0$$

It follows that the embodiment shown in FIG. 1 will pass the desired signal (input voltages equal and 180 degrees out of phase) and attenuate the longiutdinal signal (input voltages equal and in phase) when an input having both desired and longitudinal components is applied to input terminals 10 and 11. The output connection path provides an unbalanced signal at interconnection point 29 directly to the following amplification stage without the need for transformers, which are not feasible in the video range.

In practice, of course, the betas are not infinite, and the actual longitudinal suppression can be determined using the actual values of the transistor betas and emitter resistances 22 and 23. This longitudinal suppression can be shown to be:

$$20\log\frac{1+\frac{\beta_{20}}{1+\beta_{20}}\frac{R_{23}}{R_{22}}}{\frac{\beta_{20}}{1+\beta_{20}}\frac{R_{23}}{R_{22}}-1}$$

Figure 2:
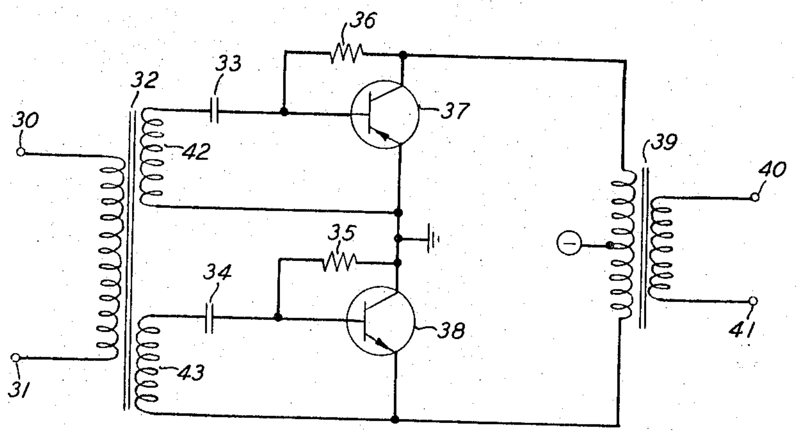
FIG. 2 PRIOR ART
FIG. 2 is a schematic diagram of the prior art Waldhauer transistor amplifier circuitry.

FIG. 2 is a circuit diagram of the Waldhauer transistor amplifier. A balanced input signal is supplied to terminals 30 and 31, which are the input terminals for input transformer 32. Transformer 32 includes two secondary windings 42 and 43. One end of secondary winding 42 is coupled through coupling capacitor 33 to one side of feedback resistor 36 and to the base terminal of PNP type transistor 37. The other side of resistor 36 is connected to the collector of transistor 37 and to the input terminal of output transformer 39. The second terminal of secondary winding 42 is connected to the emitter of transistor 37, to the collector of transistor 38 and to system ground.

One terminal of secondary winding 43 is connected through capacitor 34 to one side of feedback resistor 35 and to the base terminal of transistor 38. The other terminal of secondary winding 43 is connected to the emitter terminal of transistor 38 and to the second terminal of the input winding of output transformer 39. The input winding of transformer 39 is center tapped to a point of negative reference potential. The secondary winding of output transformer 39 provides an output at terminals 40 and 41.

An inspection of the Waldhauer circuit shown in FIG. 2 reveals similarities to the embodiment of the applicant's invention shown in FIG. 1. Note, particularly, the interconnection of the opposite conductivity type transistors. The Waldhauer circuit is capable, with the proper bias adjustment, of providing longitudinal signal suppression, but this capability is not set forth in the Waldhauer patent. In addition, and significantly, this circuit fails to provide a direct connection at the output terminal to provide an unbalanced signal. In particular, the Waldhauer circuit provides only a transformer coupled output signal, which, as discussed above, is undesirable in the video range. In addition, of course, it is undesirable to have a transformer coupled output where the desired result can be achieved while eliminating the expensive insertion of a transformer. Therefore, the embodiment of the present invention provides significant advantages over the Waldhauer transistor amplifier.

The embodiments of the present invention may be composed of only capacitors, resistors, and semi-conductors, and, thus, are capable of being manufactured utilizing integrated circuitry and thin-film techniques.

It is to be understood that the embodiments of the invention which have been described are merely illustrative of the application of the principles of the invention. Numerous modifications may readily be devised by those skilled in the art without departing from the spirit and scope of the invention.

What is claimed is:

1. A balanced to unbalanced amplifier comprising first and second transistors, each including a base, an emitter and a collector electrode, means connected across said base electrodes of said first and second transistors to supply a balanced signal to said two transistors, a first circuit path interconnecting said collector electrode of said first transistor and said emitter electrode of said second transistor through a first impedance, a second circuit path interconnecting said collector electrode of said second transistor and said emitter electrode of said first transistor through a second impedance, a point of reference potential connected to one of said circuit paths, means directly connected to the other of said circuit paths to supply an unbalanced output current signal, and means to present an impedance path to said current signal the value of which is many times smaller than said first and second impedances.

2. Apparatus as set forth in claim 1 wherein said two transistors are of opposite conductivity type.

3. Apparatus as set forth in claim 1 wherein said first and second impedances are relatively equal in value.

4. Apparatus as set forth in claim 3 wherein said first and second impedance elements are resistors.

5. Apparatus as set forth in claim 1 wherein said direct connection means interconnects a first unbalanced amplifier to said other circuit path.

6. Apparatus as set forth in claim 1 wherein said means to present said relatively low impedance path includes a third transistor.

7. Apparatus as set forth in claim 6 wherein said third transistor includes a base, an emitter and a collector electrode, said emitter electrode of said third transistor being connected to said other circuit path, said base electrode of said third transistor being connected to a second point of reference potential and said collector electrode of said third transistor being connected to a second amplifier.

8. Apparatus as set forth in claim 2 wherein said first and second impedances are relatively equal in value.

9. Apparatus as set forth in claim 8 wherein said first and second impedance elements are resistors.

10. Apparatus as set forth in claim 2 wherein said direct connection means interconnects a first unbalanced amplifier to said other circuit path.

11. Apparatus as set forth in claim 2 wherein said means to present said relatively low impedance path includes a third transistor.

12. Apparatus as set forth in claim 11 wherein said third transistor includes a base, an emitter and a collector electrode, said emitter electrode of said third transistor being connected to said other circuit path, said base electrode of said third transistor being connected to a second point of reference potential and said collector electrode of said third transistor being connected to a second amplifier.

References Cited

UNITED STATES PATENTS

| | | | |
|---|---|---|---|
| 3,246,251 | 4/1966 | Sheppard | 330—14 |
| 3,308,309 | 3/1967 | Wichmann | 330—14 X |

JOHN KOMINSKI, *Primary Examiner.*

LAWRENCE J. DAHL, *Assistant Examiner.*

U.S. Cl. X.R.

330—13, 17